A. H. RANDALL.
INFLATING DEVICE FOR PNEUMATIC TIRES.
APPLICATION FILED JAN. 20, 1917.

1,246,464.

Patented Nov. 13, 1917.

Inventor
Alfred H. Randall,

By Mercer & Blondel,
Attorneys

UNITED STATES PATENT OFFICE.

ALFRED H. RANDALL, OF BRIDGEPORT, CONNECTICUT.

INFLATING DEVICE FOR PNEUMATIC TIRES.

1,246,464.  Specification of Letters Patent.  Patented Nov. 13, 1917.

Application filed January 20, 1917. Serial No. 143,472.

*To all whom it may concern:*

Be it known that I, ALFRED H. RANDALL, a subject of the King of Great Britain, residing at Bridgeport, in the county of Fairfield and State of Connecticut, have invented certain new and useful Improvements in Inflating Devices for Pneumatic Tires, of which the following is a specification.

The object of the invention is to provide an improved apparatus for automatically pumping air into pneumatic tubes, and for maintaining uniform pressure in the tube, the invention being particularly designed for use upon automobiles, motorcycles, bicycles, and such vehicles employing pneumatic tires, means being provided for regulating the pressure within the tube to thus avoid excess pressures and the possible blowing up of the tire.

The invention comprises a compressible bulb arranged within the inner tube of the tire and communicating therewith, said bulb having an intake pipe communicating therewith and extending through the rim or felly of the wheel, and said intake pipe being surrounded by a sleeve providing an annular escape chamber to which is connected a spring seated relief valve, which is capable of being set so that the pressure within the tire may be regulated.

The invention further comprises peculiar details of construction, and arrangement of parts as will be hereinafter fully described.

Figure 1:
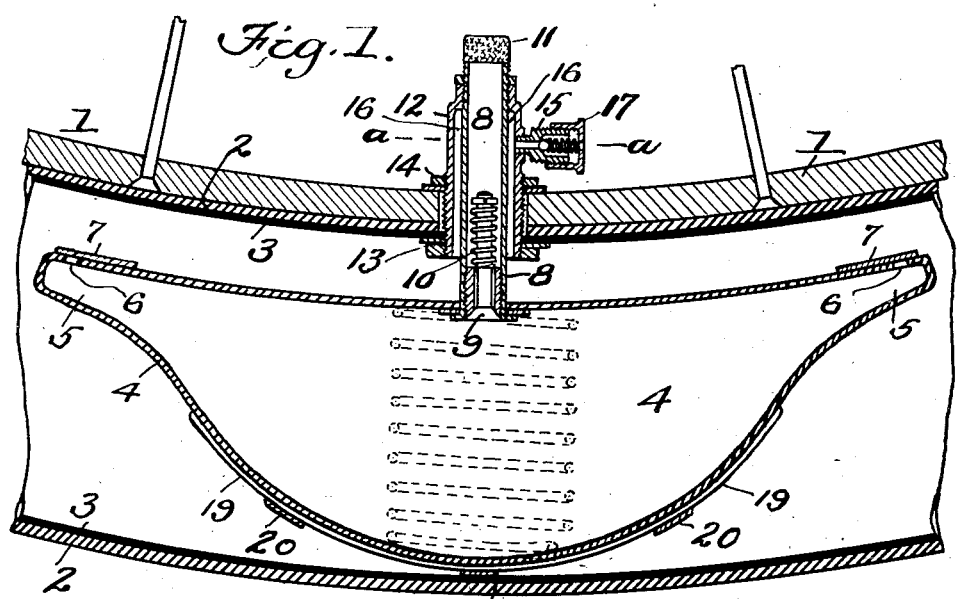
Figure 2:
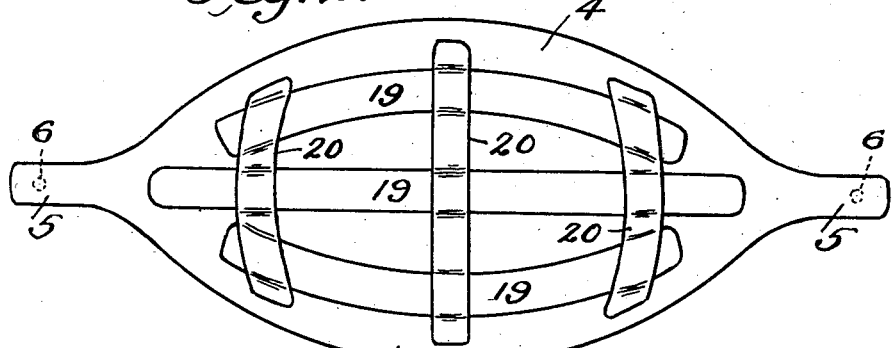
Figure 3:
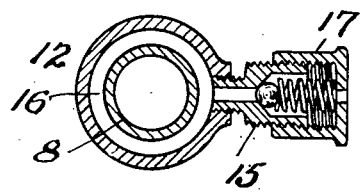

In the accompanying drawings, illustrating the invention, in the several figures of which like parts are similarly designated, Figure 1 is a vertical longitudinal section of a portion of an automobile wheel illustrating the application of the invention. Fig. 2 is an inverted plan view of the compressible bulb arranged within the rim of the wheel. Fig. 3 is a transverse section drawn on a larger scale on the line *a—a* of Fig. 1.

1 designates the rim or felly of an automobile wheel. 2 designates the tire, and 3 the inner tube thereof. Arranged within the inner tube is a compressible bulb 4, substantially double conoidal shape in vertical longitudinal section, and preferably circular in transverse section. The ends of the bulb 4 terminate in neck portions 5 having escape ports 6 upon the upper surfaces thereof, which are controlled by upwardly opening flap valves 7.

To the bulb 4 is securely connected the inner end of an air inlet tube 8 having an inwardly opening valve 9 at its inner end of usual construction, the said valve being normally held to its seat by a spring 10 surrounding the stem thereof, and which is interposed between the upper end of the seat of the valve, and a nut threaded upon the outer end of said stem. The tube 8 extends up through the tire and through the rim of the wheel, and has its upper end provided with a hood 11 of wire gauze of fine mesh to strain the air as it passes through the tube.

Surrounding the intake tube 8 is a sleeve 12, threaded at its inner end to receive clamping nuts 13 and 14, which serve to hold the sleeve tightly in position in the usual manner of such devices now employed in connection with pneumatic tires. As shown, the sleeve is threaded upon the upper end of the tube 8.

15 designates a relief valve tapped into the wall of the sleeve 12, and communicating with the annular exhaust air passage 16 formed by the tube and the sleeve. The valve 15 is provided with an adjustable head 17 threaded upon the barrel of the valve casing, whereby the valve may be set to thus regulate the pressure of air in the tire, and hence avoid excess pressures and the possible blowing up of the tire.

The bulb is normally held in an expanded position by flat springs 19 (Figs. 1 and 2), preferably arranged exteriorly thereof and secured by means of transverse strips 20 of fabric or rubber, or a composition of fabric and rubber, which are vulcanized or otherwise securely fastened to the bulb. It will be understood that, if desirable, an expansion spring may be arranged within the bulb (as shown in dotted lines in Fig. 1), for assisting the springs 19 in holding the bulb expanded when pressure thereon is relieved.

In operation the bulb is placed within the tube, as shown, so that the intake pipe 8 extends through the rim of the wheel and opens to atmospheric air. Now as the wheel rotates and the bulb is compressed, when the adjacent portion of the rim contacts with the roadbed, the bulb is compressed and the air therein is forced out past the flap valves 7 into the interior of the tire. As the wheel continues to rotate, pressure upon the bulb is relieved and the latter is caused to expand, or to assume its natural shape by means of the aforesaid springs, it being understood, that when it is expanded, a fresh supply of atmospheric air is drawn into the bulb 4 through the intake tube 8, and which air is forced into the tire during the next complete revolution of the wheel.

It is observed that my invention provides for automatically regulating the pressure of the tubes, and for maintaining a uniform pressure therein, and in the operation of this feature, the valve is set, we will say, to a pressure of seventy pounds, so that the instant the slightest excess of this pressure is pumped into the tire, the valve will be unseated and the excessive quantity of air allowed to escape, thus maintaining the desired pressure and positively avoiding injury to, or the complete destruction of the tire.

What I claim is:—

Means for inflating pneumatic tires, comprising a bulb disposed within the tire and having a valved inlet and a valved outlet, and a plurality of flat springs secured to the outer or tread side of the bulb.

In testimony whereof I have hereunto set my hand this 18th day of January, A. D. 1917.

ALFRED H. RANDALL.

Witnesses:
J. ARTHUR PEASE,
WESLEY FRUBER.